United States Patent

Pestka et al.

[15] 3,701,302
[45] Oct. 31, 1972

[54] GROMMET TYPE FASTENER

[72] Inventors: John A. Pestka, Park Ridges; Lloyd A. Erickson, Niles, both of Ill.

[73] Assignee: Illinois Tool Works Inc., Chicago, Ill.

[22] Filed: March 29, 1971

[21] Appl. No.: 128,801

[52] U.S. Cl. ................................. 85/80, 85/82
[51] Int. Cl. ..................................... F16b 13/06
[58] Field of Search ............. 85/80, 5, 82, 83, 70–71, 85/72, DIG. 2; 151/41.75; 24/73 HS, 73 PF, 213 R, 208 A

[56] References Cited

UNITED STATES PATENTS

| | | | |
|---|---|---|---|
| 2,836,215 | 5/1958 | Rapata | 85/80 |
| 3,200,694 | 8/1965 | Rapata | 85/82 |
| 3,342,098 | 9/1967 | Schuplin | 85/83 |
| 3,343,441 | 9/1967 | Van Buren | 85/70 |
| 3,574,899 | 4/1971 | Fisher | 85/80 X |
| 3,579,942 | 5/1971 | Cole | 151/41.75 X |
| 3,593,612 | 7/1971 | Schulze | 85/80 |

FOREIGN PATENTS OR APPLICATIONS

| | | | |
|---|---|---|---|
| 37,368 | 1/1936 | Netherlands | 85/80 |

*Primary Examiner*—Ramon S. Britts
*Attorney*—Olson, Trexler, Wolters & Bushnell, Robert W. Beart, Jack R. Halvorsen, Thomas W. Buckman and Edward L. Benno

[57] ABSTRACT

The present invention relates generally to improvements in plastic fasteners and more particularly to the provision of novel and extremely practical one-piece plastic grommet type anchor members for accommodating the threaded shank of a screw member when positioned within a work aperture. The anchor member disclosed herein includes a head section for clampingly engaging one side of an apertured workpiece, and a shank section comprising an elongate hollow portion for accommodating a screw shank, and diametrically disposed outwardly flaring shank arms integrally connected with the entering extremity of hollow portion and having free work engaging extremities. The shank arms and the wall defining the hollow portion are laterally expandable in response to forces applied axially thereof.

9 Claims, 14 Drawing Figures

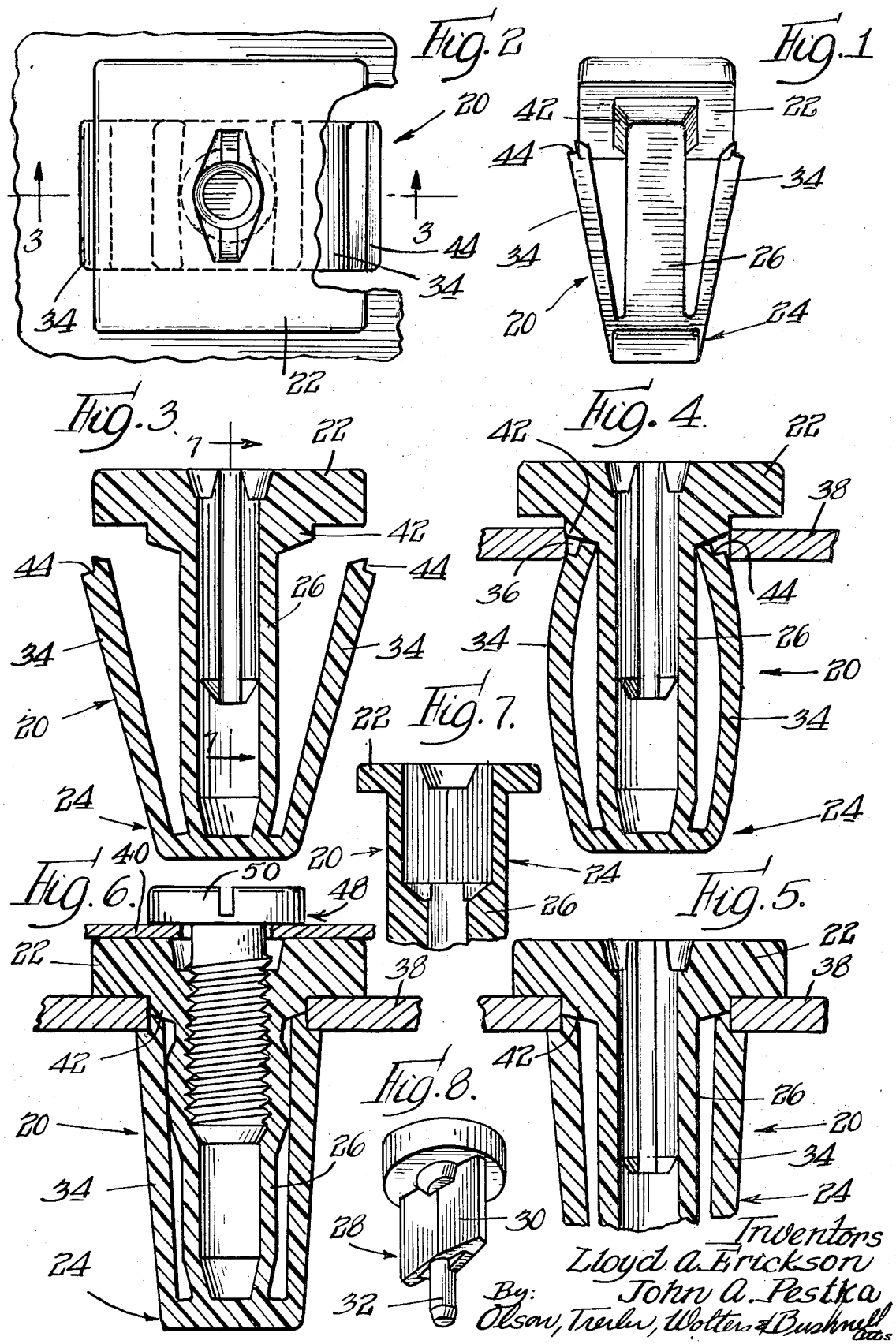

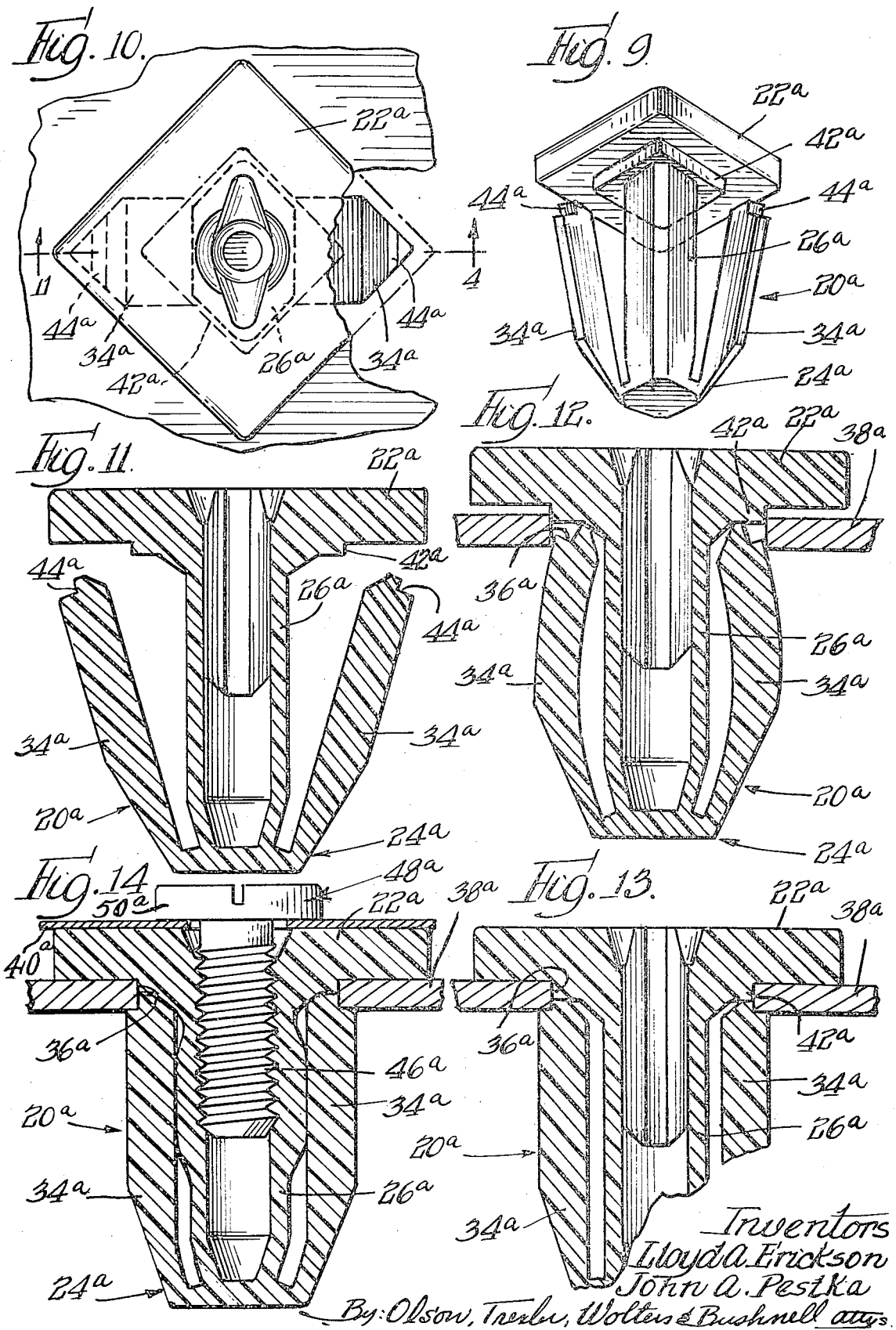

3,701,302

GROMMET TYPE FASTENER

SUMMARY OF THE INVENTION

Various types of grommet type fasteners have been employed to secure panels or sheets together. One problem incident to the use of such grommets with electrical appliances such as radios, television sets, etc., is that of insufficient electrical insulation. Many of the commercially available plastic grommets for accommodating screw fasteners do not fully encapsulate the shank of the screw, and as a result electrical arcing may occur. It is one of the important objects of the present invention to provide a grommet type fastener, or anchor member which will electrically insulate screws accommodated thereby from the work to which the anchor members are applied.

More specifically, the present invention contemplates a grommet type fastener or anchor member of the type referred to above, having a novel shank structure which will not only electrically insulate the screw shank, but will more effectively bind together metallic sheets or panels accommodated thereby.

The present invention contemplates the provision of a plastic anchor member as set forth above, which upon tightening a screw member accommodated by the anchor member, the plastic shank thereof will expand in response to forces applied axially thereof as the head of the screw is tightened against a workpiece retained by the anchor member.

BRIEF DESCRIPTION OF THE DRAWINGS

The foregoing and other objects and advantages will be more apparent from the following detailed description when considered in connection with the accompanying drawings wherein:

FIG. 1 is a perspective view of a grommet type fastener or anchor member which is representative of one embodiment of the present invention;

FIG. 2 is a plan view of the anchor member illustrated in FIG. 1;

FIG. 3 is a central, vertical, sectional view of the anchor member taken substantially along the line 3—3 of FIG. 2, said anchor member being disclosed before insertion within a work aperture;

FIG. 4 is a central, vertical, sectional view similar to FIG. 3, disclosing the anchor member inserted within the work aperture just prior to the complete telescopic association therewith of the shank of the anchor member;

FIG. 5 is a fragmentary, vertical, sectional view similar to FIG. 4, disclosing the complete telescopic assembly of the anchor member within a work aperture and prior to the application of the fastening screw thereto;

FIG. 6 is a sectional view similar to FIG. 5, disclosing the screw fastener applied so as to expand the wall of the elongate hollow portion of the anchor member into impingement with the inner surfaces of the oppositely disposed arm members;

FIG. 7 is a fragmentary, vertical view of the anchor member taken substantially along the line 7—7 of FIG. 3;

FIG. 8 is a perspective view of the core used in molding the anchor member to form the longitudinal recess of diamond shaped cross sectional shape for accommodating the screw fastener shown in FIG. 6, said view serving to illustrate more clearly the shape of said recess.

FIG. 9 is a perspective view of a modified form of anchor member;

FIG. 10 is an enlarged plan view of the device shown in FIG. 9;

FIG. 11 is a vertical, central, sectional view taken substantially along the line 11—11 of FIG. 10, prior to the telescopic assembly of the anchor member with a work aperture;

FIG. 12 is a vertical, central, sectional view similar to FIG. 11, disclosing the anchor member inserted within a work aperture just prior to the complete telescopic association therewith of the shank of the anchor member;

FIG. 13 is a fragmentary vertical sectional view similar to FIG. 12, disclosing the complete telescopic assembly of the anchor member within a work aperture and prior to the application thereto of the fastening screw;

FIG. 14 is a vertical, sectional view similar to FIG. 13, disclosing the screw fastener applied so as to expand the wall of the elongated hollow portion of the anchor member into impingement with the inner surface of the oppositely disposed arms.

DESCRIPTION OF THE PREFERRED EMBODIMENTS

Referring now to the drawings more in detail wherein like numerals have been employed to designate similar parts throughout the various figures, it will be apparent that an anchor member which is representative of one embodiment of the invention is illustrated in FIGS. 1–7, inclusive, and is designated generally by the numeral 20. This anchor member or grommet 20 includes a head section 22, and an integral shank section designated generally by the numeral 24. The shank section 24 includes an elongate hollow or tubular portion 26. The upper portion of the recess defined by the wall of the hollow elongate section 26 is substantially diamond shaped in cross section as indicated in FIG. 2. To more clearly illustrate the detailed shape of the elongate recess defined by the hollow portion 26, a perspective view of the core used in molding the recess is shown in FIG. 8, and is designated generally by the numeral 28. The portion 30 of the core 28 serves to produce the recess of diamond shaped cross section and the lower or depending portion 32 forms the lower recess portion of circular or tubular cross section.

Formed integral with and flaring outwardly from the lower or entering extremity of the hollow portion 26 is a pair of fastener arms, each being designated by the numeral 34. The maximum transverse dimension of the entering extremity of the shank 24 is substantially equal to, or slightly less than, the transverse dimension of the square aperture 36 of a metallic sheet or panel 38, FIG. 4. A portion 42 extending downwardly from the underside of the head 22 is square in transverse section and conforms substantially in size with the square work aperture 36.

As the member 20 is initially inserted within the work aperture 36, the arms 34 are flexed inwardly until the upper extremities thereof engage the underside of the depending head portion 42, as shown in FIG. 4. It will be noted that the underside or axially facing surface of the depending head portion is tapered inwardly and downwardly. The free extremity of each of the arms 34, which can be complimentarily tapered, have a thinner cross sectional extent than the underside of the head portion 42. Further, the length of the arms 24 are controlled so that the free end surface will initially be complimentary to the underside of the depending head portion 42, but will cause, as the legs are pushed radially inwardly to ride down said tapered surface and to foreshorten the leg in its inner position. In this position the arms 34 are bowed and the depending head portion 42 registers within the aperture 34. By exerting pressure on the outer surface of the head 22, from the position shown in FIG. 4, to the position shown in FIG. 5, notches 44 provided at the outer or free extremities of the arms 34 allow said arms 34 to move laterally to interlock with the adjacent corner edges of the workpiece 38. A second apertured work sheet or panel 40 is positioned adjacent the outer surface of the grommet head 22.

Application of the threaded shank 46 of a fastener screw 48 having a head 50 causes thread convolutions to be formed or indented within the upper portion of the hollow member 26. As the screw enters, the shank portion 26 expands as illustrated in FIG. 6. The minimum diameter of the screw accommodating opening is less than the maximum diameter of the screw shank and therefore, expansion of the shank wall occurs. As the head 50 of the screw member 48 tightens the sheet 40 against the outer surface of the grommet head 22, oppositely disposed sections of the elongate hollow portion 26 of the grommet shank are further forced or bulged radially outwardly into impingement with the inner surfaces of the arms 34. In this manner the anchor member or grommet 20 is firmly secured within the work aperture, and the work sheets or panels 38 and 40 are tightly clamped in spaced relation. Particular attention is directed to the fact that the entering extremity of the shank section is closed so that the shank 46 of the screw member 48 becomes completely encapsulated or electrically insulated within the grommet after it has been tightened in position. Hence the grommet serves as an effective electrical insulator between the workpiece and the screw.

While the minimum diameter of the screw accommodating opening in the shank portion 26 is slightly less than the outer diameter of the screw shank, the maximum internal diameter is substantially greater due to the above-mentioned diamond shape. This serves to enhance the lateral yieldability of the opposed walls of the shank portion 26.

FIGS. 9–14, inclusive, illustrate a modified form of an anchor member or grommet designated generally by the numeral 20a. The only substantial structural difference between the grommet 20a, and the previously described grommet 20, is in the disposition of the arms 34a with respect to the grommet head 22a. In the embodiment disclosed in FIGS. 1–7, inclusive, the arms 34 flex in substantial parallelism with opposite sides of the head 22, whereas in the embodiment as disclosed in FIGS. 9–14, inclusive, the arms flex diagonally with respect to the sides of the grommet head 22a. Also the outer extremities of the arms 34a are tapered so as to interlock with the oppositely disposed corners defining the work aperture 36a. In all other respects the structure of the grommet 20a conforms substantially with the previously described grommet 20. The various elements of the grommet 20a, corresponding with like elements of the grommet 20, are given similar numerals bearing the suffix a.

From the foregoing it will be apparent that the present invention contemplates an improved highly efficient anchoring member or grommet which serves to hold worksheets in firm juxtaposition. Also by electrically insulating the screw member from the metallic worksheets arcing is precluded. The above described grommets may be formed of suitable electrically insulating plastic material having the required degree of resiliency to assure a firm fastening. The design of the above described anchor members or grommets is such as to permit the manufacture thereof by conventional molding methods and hence, the cost of manufacture is reduced to a minimum.

We claim:

1. A one piece plastic anchor member for application to an apertured workpiece in position to accommodate a threaded shank of a screw member, said anchor member including a head section providing a surface for clampingly engaging one side of a workpiece, and a shank section extending axially from said head section, said shank section including an elongate hollow portion defined by an expandible wall for accommodating a screw shank and diametrically disposed normally outwardly flaring shank arms integrally connected with the entering extremity of said hollow portion and having free work engaging extremities positioned in the vicinity of the underside of the head section, said head section being provided with a polygonal axial extension acceptable within said workpiece aperture, said extension having an axially facing tapered end surface which extends inwardly and downwardly towards the entering end of said shank in opposition to the extremities of said arms, the extremities of said arms being adapted to contact and ride down said tapered end surface when said shank arms are collapsed upon insertion within a complementary work aperture, the maximum length of said shank arms being greater than the dimension from the radially innermost portion of said tapered end surface to the connection of said shank arms with said hollow portion while said length is substantially equal to the dimension from the radially outermost portion of said tapered end surface to said connection, whereby said shank arms are foreshortened and bowed as they ride down said tapered surfaces during insertion and spring outwardly after their extremities pass through said aperture, so as to underlie said panel, and the wall defining said hollow portion being laterally expandible in the form of a bulge in the vicinity of the clamping surface of the head section and abutting the inner opposed surfaces of said arms as an incident to the application thereto of a screw shank.

2. A one piece plastic anchor member for application to an apertured workpiece as set forth in claim 1, wherein the outer extremities of the shank arms are formed to interlock with complementary corner portions defining the work aperture.

3. A one piece plastic anchor member for application to an apertured workpiece as set forth in claim 1, wherein the outer extremities of the shank arms are notched for engaging complementary corner portions of a workpiece defining the work aperture.

4. A one piece plastic anchor member for application to an apertured workpiece as set forth in claim 1, wherein the hollow shank portion toward the head extremity is provided with an opening having a minimum diameter which is less than the diameter of the screw shank to be accommodated thereby.

5. A one piece plastic anchor member for application to an aperture workpiece as set forth in claim 4, wherein the maximum diameter of the shank opening toward the head extremity is substantially greater than the outer diameter of the screw to be accommodated, whereby to enhance the lateral yieldability of the wall defining said opening.

6. A one piece plastic anchor member for application to an apertured workpiece as set forth in claim 4, wherein the opening of the hollow screw accommodating shank portion is substantially diamond shaped in transverse section.

7. A one piece plastic anchor member for application to an apertured workpiece as set forth in claim 1, wherein the hollow shank portion in the vicinity of the entering extremity thereof is reduced in cross sectional area to facilitate insertion thereof within a work aperture.

8. A one piece plastic anchor member for application to an apertured workpiece as set forth in claim 1, wherein the axial extension of the head section substantially conforms in cross section with the aperture of the workpiece.

9. A one piece plastic anchor member for application to an apertured workpiece as set forth in claim 1, wherein said hollow shank portion completely traverses the entering extremity of an associated screw shank so as to completely insulate said screw shank from the apertured workpiece.

* * * * *